June 28, 1949.   G. F. BEHRINGER   2,474,646
SPLIT STATOR
Filed May 30, 1944

INVENTOR.
Grover F. Behringer
BY
atty's

Patented June 28, 1949

2,474,646

UNITED STATES PATENT OFFICE 2,474,646

SPLIT STATOR

Grover F. Behringer, Defiance, Ohio, assignor to The American Steel Package Company, Defiance, Ohio, a corporation of Ohio Application May 30, 1944, Serial No. 538,085

1 Claim. (Cl. 175—41.5)

My present invention relates to electrical condensers, especially those usually employed in radio receiving and transmitting sets and in which there is a "split stator" or arrangement of stator plates in a plurality of series, which series must be insulated from each other.

One object of the invention is to provide a common means for supporting the various series of the stator plate assembly, thus eliminating individual supports from the frame of the condenser to each series of stator plates and the attendant difficulty in aligning the plates of each series with the rotor of the condenser.

Another object is to provide such common mounting means in the form of a mounting plate arrangement comprising insulating plates which properly space the various series of stator plates and rigidly hold them in their spaced relation to each other, the insulating plates being reinforced inside and out by metal mounting plates and/or retainer plates which are provided for each series of stator plates and properly space the plates thereof, whereas the insulation plates embrace all the stator plates thus minimizing the production cost of a split stator plate unit.

A further object is to provide such a stator plate unit which may be mounted in a condenser frame and accurately positioned relative thereto by means of a suitable assembling jig with the mounting plate arrangement adjacent mounting posts which project from the condenser frame and to which the mounting plate arrangements are then soldered so that upon chilling of the solder and removal of the assembling jig, accuracy in the placement of the stator plates with relation to the bearings for a rotor shaft is assured and mounting of the shaft and its rotor thereafter will always result in the rotor blades being equally spaced between the blades of the stator and in the proper parallel position with relation thereto.

Still a further object is to provide a split stator assembly which is an improvement from the standpoint of cost of parts and assembly time when compared with my former Patent No. 1,934,907 issued November 14, 1944.

With these and other objects in view, my invention consists in the construction, arrangement and combination of the various parts of my split stator whereby the objects contemplated are attained, as hereinafter more fully set forth, pointed out in my claim and illustrated in the accompanying drawings, wherein:

Figure 1:
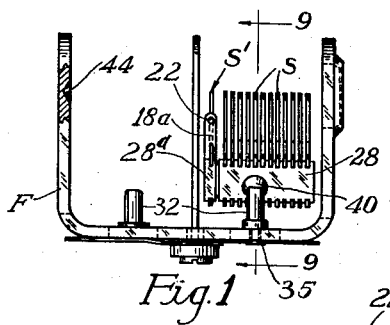
Fig. 1 is a side elevation of a gang type condenser showing one of my split stators mounted therein and a mounting post for a second one.
Figure 2:
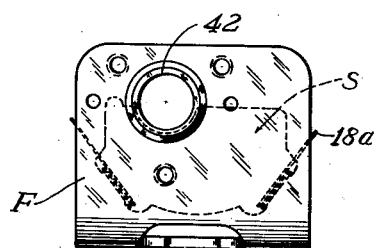
Fig. 2 is an end elevation of Fig. 1.
Figure 3:
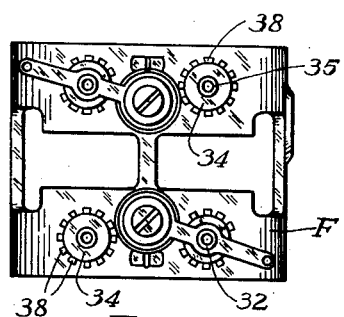
Fig. 3 is a bottom plan view of Fig. 1.

On the accompanying drawings, I have used the reference character F to indicate a frame. Within the frame F is a split stator, that is, a stator having two or more series of plates or sections such as S and S'. Each section comprises a series of stator plates and one of the plurality of series may have only a single plate such as illustrated for the stator section S'.

The stator plates are all of the same shape and have been referred to in general by the reference numeral 10. Each stator plate has a pair of recesses 12 for a mounting plate arrangement and the sides of these recesses are indicated at 14 and 16 as perhaps best shown in Fig. 11.

Figure 4:
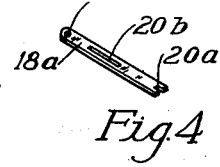
Figs. 4, 5, 6, 7 and 8 are perspective views of different parts of the mounting plate assembly which will be hereinafter referred to specifically.

In each recess is a first mounting plate 18 or 18a as the case may be. The mounting plate 18 is for a plurality of stator plates and accordingly has a plurality of notches 20 in its opposite side edges. The mounting plate 18a is actually only a narrow strip of metal as shown in Fig. 4 as it is for a single stator plate (S'). It has a notch 20a at one end and a slot 20b serving as a notch at the other end and at the same time having an extension to provide a terminal as by means of a perforation 22 into which a wire may be soldered.

Figure 5:
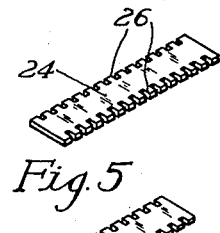
Figure 10:
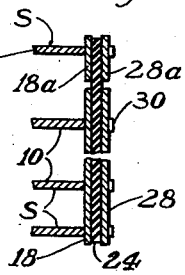
Fig. 10 is an enlarged sectional view on the line 10—10 of Fig. 9.

A second mounting plate is provided and it is shown in Fig. 5. It bears the reference numeral 24, is made of insulating material, and like the mounting plate 18, has notches in its sides (designated 26). The insulation plate 24, it will be noted, extends across the entire series of stator plates S and S' as best shown in Fig. 10. The plate 24 is formed of a dielectric material so as to electrically isolate the stator section S' relative to the stator section S yet rigidly connect them together in a mechanical sense for support in relation to the frame F as will hereinafter appear.

Figure 6:
Figure 7:
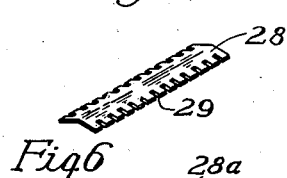
Figure 8:

A third supporting plate which also acts as a retainer plate is shown at 28. A corresponding narrow plate 28a is provided, the two plates being shown respectively in Figs. 6 and 8. These plates, it will be noted, are initially bowed or formed as two flanges at an obtuse angle to each other for an important purpose which will hereinafter be brought forth.

Figures 11, 12:
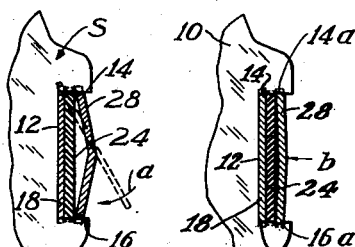
Figs. 11, 12 and 13 are enlarged views of a portion of Fig. 9 showing the parts during different assembly operations and the final assembled positon in Fig. 13.

Referring to Fig. 11, it will be noted that the supporting plates 18, 24 and 28 have been inserted into the recess 12 of a stator plate 10. These plates are preferably held in an assembly jig that properly spaces them so that the plates 18, 24 and 28 may be readily placed with their notches 20, 26 and 29 receiving the edges 14 and 16 of the stator plates. The dotted position shows the initial position of the plate 28, after which it is swung in the direction of the arrow a to seat against the bottom of the recess 12. The edge 16 is slightly slanted outward to permit such swinging of this plate and also the plates 24 and 28 to the final position shown in this figure.

Figures 13, 14:
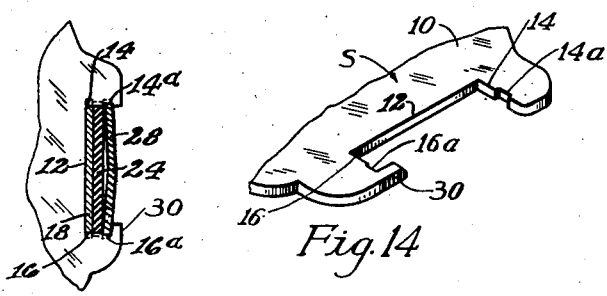
Fig. 14 is a perspective view of one of the stator plates after the mounting means has been assembled relative thereto and then removed.

The third supporting plate or retainer plate 28 is then straightened out to nearly a flat position by pressure as indicated by the arrow b in Fig. 12 which increases its effective width and in actual practice causes the edges of the plate 28 adjacent the bottom of the notches 29 therein to dig into the recess sides 14 and 16 as indicated at 14a and 16a. Each stator plate then actually has the shape shown in Fig. 13 with the retainer plate 28 accomplishing its retaining action by its edges actually digging into the stator plate at 14a and 16a (shown somewhat exaggerated) and the flattened portion 30 aiding in the retention of the supporting plate assembly rigidly relative to the stator plates. Fig. 14 illustrates the final shape of the stator plate if the plates 18, 24 and 28 are removed, the depth of the notch portions 14a and 16a being slightly exaggerated for clarity. During pressure application at b or in a following operation the outer end of the edge 16 may be flattened slightly as indicated at 30 in Fig. 13.

In a manner similar to that just described, pressure as at b is also applied to the retainer plate 28a as will be obvious and thus each section of the stator is rigidly supported on the supporting plate assembly with the insulating plate 24 serving as a mechanical connection between the stator sections and, at the same time, electrically insulating them from each other.

Figure 9:
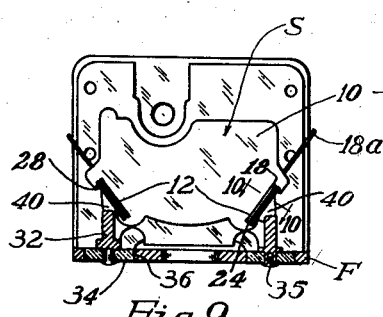
Fig. 9 is a sectional view on the line 9—9 of Fig. 1.

It will be noted that I have described but one mounting plate assembly whereas actually there are two as best shown in Fig. 9 but since these are identical in construction and assembly, no further description is necessary in respect thereto. The two supporting plate assemblies are finally supported relative to the frame F in the following described manner:

Mounting posts 32 (one for each supporting plate assembly) are extended through insulating washers 34 and peened as indicated at 35 for rigid support relative thereto. The washers 34 are mounted in perforations 36 of the frame F and snugly fit these perforations. After they are placed in position, the frame is peened against the edges of the insulating washers by a series of depressions 38 around the edges of the perforations 36, both on the inner surface and the outer surface of the frame F. This contracts the size of the opening 36 to effect a rigid mounting of the insulating washers in the frame.

After the stator has been assembled in relation to its two supporting plate assemblies, it is held by a suitable assembly jig in the position shown in Fig. 9 and a drop of solder 40 used to connect each mounting post to the supporting plate assembly. The solder adheres to the upper end of the post and to the outer supporting or retainer plate 28. When the solder has chilled, the assembly jig is removed and the assembler is assured that the stator plates are in the proper position with respect to a bearing opening 42 in one end of the frame and a ball thrust bearing seat 44 in the other end for the shaft of the rotor as shown in my prior patent. As the rotor forms no part of my present invention, I have not shown it.

The supporting means disclosed for the stator plates properly spaces them with relation to each other by the notches 20 and 20a in the plates 18 and 18a and also by the notches in the insulating plate and the retainer plates 28 and 28a. The recesses 12 are spaced from each other and are at substantially right angles to each other which, together with the width of the mounting plate assembly, gives a four point support for each stator plate that assures their alignment relative to each other and equal spacing between all parts of the plates without any chance of the plates inclining toward or away from each other at their upper unsupported edges.

The mounting plates 18, 24 and 28 may be quickly assembled by unskilled labor after a little practice and the plate 28 flattened as in Fig. 13, followed by the recess ends 16 being flattened as at 30 to provide an accurately assembled stator S together with its section S' in rigidly supported relation thereto. The assembly is such that after completion, the entire stator may be readily mounted in the frame F and located in an exact position relative thereto by the use of a proper assembly jig followed by the soldering operations at 40 that permit variation in the placement of the mounting posts but insure that when the stator is supported by the solder relative thereto, the stator will be properly aligned with the frame. All of these features contribute to an inexpensive split stator assembly well adapted for quantity production and to the fabrication of relatively small and therefore inexpensive condensers for radio work. Small size is very desirable in connection with home radio as well as those that are used in airplanes where weight is an all-important consideration.

My assembly and the method of performing it is readily adaptable for the production of condensers with great accuracy in respect to the spacing of the plates because they may be closely spaced to cut down the overall dimensions and yet retain the needed capacity which can be secured in air dielectric condensers by reducing the spacing and therefore the necessary size of the plates.

Some changes may be made in the construction and arrangement of the parts of my split stator without departing from the real spirit and purpose of my invention, and it is my intention to cover by my claims any modified forms of structure or use of mechanical equivalents which may be reasonably included within their scope without sacrificing any of the advantages thereof.

I claim:

A split condenser stator comprising a plurality of series of stator plates having recesses in their edges, and a common means for supporting all of said series of plates and insulating said series from each other, said means comprising a dielectric mounting plate for all of said series having notches in its edges receiving opposite side edges of the recesses in said stator plates, a plurality of spaced expandable retainer plates, one for each series of stator plates, said retainer plates having notches in their edges receiving opposite side edges of the recesses in said stator plates, said retainer plates being positioned in said recesses and being adapted to be expanded to grip the side edges of said recesses, and a reinforcing plate for each series of stator plates spaced from each other and being disposed in said recesses in the stator plate prior to the dielectric plate and said expandable plate, all three of said plates being tightly held in engagement with each other by said expandable plate.

GROVER F. BEHRINGER.

REFERENCES CITED

The following references are of record in the file of this patent:

UNITED STATES PATENTS

| Number | Name | Date |
|---|---|---|
| 1,058,210 | Welch | Apr. 8, 1913 |
| 1,934,907 | Behringer | Nov. 14, 1933 |
| 1,940,854 | Forbes | Dec. 26, 1933 |
| 2,010,584 | Cramer | Aug. 6, 1935 |
| 2,105,659 | Jacobi | Jan. 18, 1938 |
| 2,264,502 | Behringer | Dec. 2, 1941 |

FOREIGN PATENTS

| Number | Country | Date |
|---|---|---|
| 8,829 | Great Britain | Oct. 13, 1913 |
| 480,537 | Great Britain | Feb. 22, 1938 |